May 14, 1940.   F. G. NEAL   2,201,113

ANTISKID TREAD

Filed June 16, 1937

INVENTOR
FRANKLIN G. NEAL
BY Chapin + Neal
ATTORNEYS

Patented May 14, 1940

2,201,113

UNITED STATES PATENT OFFICE 2,201,113

ANTISKID TREAD

Franklin G. Neal, Springfield, Mass., assignor to Springfield Wire & Tinsel Co., West Springfield, Mass., a corporation of Massachusetts Application June 16, 1937, Serial No. 148,458

5 Claims. (Cl. 152—211)

My invention relates to an improvement in rubber tire and other tread constructions and method of making same. The purpose of the improvement is to give the tread antiskid properties in a new and useful manner.

I will disclose the invention with respect to several specific ways to put it in practice and other and substantially equivalent ways to practice the same will readily occur to the man skilled in the art from the specific disclosure herein.

Referring to the accompanying drawing.

Figure 1:
Fig. 1 shows a cord having flattened tinsel wire helically wound on the same.
Figure 4:
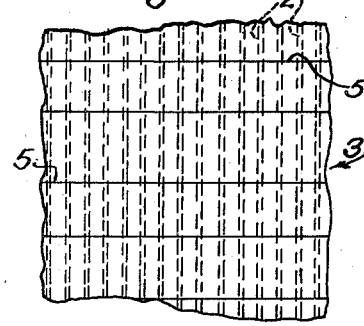
Figure 2:
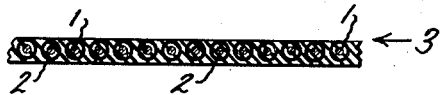
Figure 3:
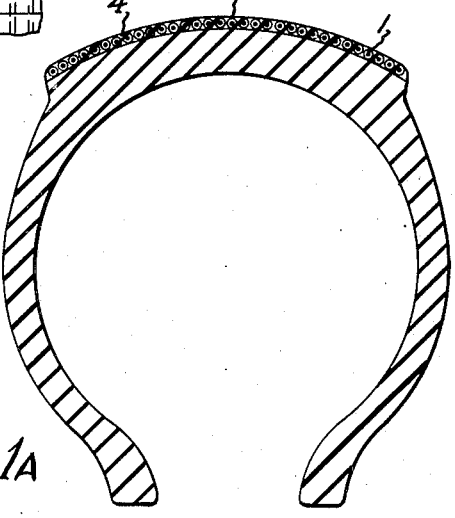

Fig. 2 indicates in section a layer of cords, such as shown in Fig. 1, embedded in rubber;

Fig. 3 indicates in section a complete tire construction in which the composite layer of Fig. 2 is integrally vulcanized in the tire as a tread wearing layer, and Fig. 4 is a top plan view of Fig. 2 somewhat reduced.

The material of Fig. 1 preferably consists of a cotton cord 1, such as commonly used in cord tire construction, and a flattened tinsel wire 2 helically wound on the cord, the tinsel metal being preferably made of brass. The purpose of having the tinsel wire of brass metal is to provide in one way for bonding the metal part to the rubber when the material of Fig. 1 is built into the tire tread construction of Fig. 3. It is a generally known fact in the rubber molding art that when rubber is to be bonded to metal, one way to do it is to brass plate the metal, if it is not already of brass, then lay on unvulcanized rubber and vulcanize the assembly, the vulcanization of the rubber resulting in a bond between the rubber and metal. So far as I know, this idea has not before this application been suggested for improving antiskid tire treads in which there is a metal component. I use this idea but the present invention broadly does not depend on this particular feature, although I believe it to be of specific importance to the best practice of the invention. In referring to the metal component as brass, I intend of course to include brass plated metal, or use of alloys in which the metal has enough brass characteristics to accomplish the bonding purpose under vulcanization with rubber. I also contemplate the step of coating the tinsel metal 2 with a thin electrolytic deposit of rubber—a known rubber coating step, then winding that kind of coated tinsel wire on the cord 1 and building the composite cord into the sheet material of Fig. 2. In that way also the tinsel metal can be bonded to the rubber of the tread in the final vulcanization of the tread.

This material of Fig. 1 is generally an article of commerce, but so far as I know never before suggested for use in tire construction. It is made on machines usually called serving or gimp machines such as shown generally in U. S. Patents Nos. 1,381,933; 1,377,548; and 1,403,181. It is commonly used for abradant purposes as scouring and polishing material. The machines for making it are highly developed, not only for making abradant material, but also for electrical purposes, as for example in Patent No. 1,377,548, where the character of the tinsel wire is noted— this flattened wire being commonly thinner than tissue paper. On account of this condition of an art remote from tire making, the material of Fig. 1 can be produced at a very low cost, and the tinsel wire can be made somewhat heavier for my purpose. The amount of metal by weight per yard of metal gimped cord is, however, kept extremely small in my use of it. There are advantages in this fact apart from the lower cost of material, as I will point out.

The metal gimped cord of Fig. 1 is made into a composite rubber sheet 3, as indicated in Fig. 2. There are so many known ways to make composite rubber sheets of this character that no specific description is necessary. Consequently, I merely refer to the sheet as one which may be made up in any manner such as used for cord and rubber, the distinction in my product at this point being the presence of the flattened tinsel metal 2 wound helically around the cord or thread 1. Except for that, the rubberized cord sheet may be made up as rubberized cotton cord sheets are made up in the tire art, for example for the cord tire carcass plies, but thicker, as indicated. With regard to the character of helical coils of tinsel metal 2 on the cotton cords 1, such coils can be made tight or somewhat loose; they may be made with a pitch to space them so as to show the cotton cord between the coils. I prefer and advise a looseness of the metal coils on the cotton cord as made, for example, according to the method of winding with the help of a stationary needle as shown in Fig. 2 of Mason's Patent No. 1,403,181, and also with a pitch to expose the cotton cord between coils of metal. This arrangement is intended to be indicated in Fig. 1. It gives the rubber, of the sheet of Fig. 2, a better chance to bond with both the cotton cord 1 and tinsel metal coils 2 in the final vulcanization of the sheet in the tire tread layer 4 of Fig. 3. The advantage of this will be pointed out.

When the rubberized sheet of Fig. 2 is made, it is then built into the tire of Fig. 3 as the outside tread layer 4, and the tire is vulcanized. In this connection I have shown only one of such layers and the cords are indicated as extending circumferentially of the tire. The rest of the tire, apart from the wearing tread layer 4, can be made as usual in the tire art, as indicated in Fig. 3. This direction of cord arrangement may vary in any way, as will be understood by the man skilled in the tire art.

I prefer to arrange the cords circumferentially of the tire, although in so doing I contemplate, in some instances, making transverse cuts 5 across the sheet of Fig. 2 so as to break down the circumferential length of the cords into short lengths, whereby they will take no circumferential strain all around the tire tread, see Fig. 4. This is not essential but is preferred so as to provide for tread working of the materials with greater ease, as will be understood. My idea is that the cotton cords and tinsel metal, being bonded to the wearing tread rubber after vulcanization of the tire, will stay in the tread for my purpose and not be thrown out in use to any objectionable extent.

The tread surface of a tire, as indicated in Fig. 3, embodying my invention, will have an "abradant" characteristic to give it a special antiskid function. While the improved antiskid surface may be combined with antiskid rubber surfaces such as are formed by usual antiskid rubber configurations of the tread, the invention has an additional advantage. It is that with the special antiskid surface provided by the invention, the same reliance need not be put on molding the rubber tread surface into antiskid patterns, as with the usual antiskid configurations. A smooth tread offers the best rolling surface and the only objection ordinarily is its tendency to slip on occasions. Under common road conditions today, the anti-slip feature of the tire, as on wet or icy, smooth, hard road surfaces, is all important. By the use of my invention, for the roads traveled by the majority of vehicles, the tires may be made smooth and the anti-slip function accomplished by building the material of Fig. 1 into the smooth tread surface of the tire to real advantage. Of course the anti-slip construction of this invention may be also built into tires having the usual antiskid tread patterns.

With regard to the wearing of the tread with my antiskid material bonded in the rubber, my idea is that the tread will wear down as rubber treads do, and as the rubber wears away so will the tinsel metal wear away. The metal component is so thin and of such light weight over the area of the tread and is built in such a way that it can work in harmony with the rubber, as both wear away at the surface. The tinsel metal being arranged in helical coils, as illustrated, will of course quickly wear through and the coil formation will be quickly broken. This will leave tinsel metal pieces of general U-shape, bonded to the tread by the cord and by the bond between rubber, cord, and metal. The legs of the U-shaped pieces of tinsel metal will end at the tread surface of the tire. There will be so many of them, many more than ten ends per square inch of tread surface, that such surface will be given the "abradant" function of the tinsel material translated into the antiskid surface function for the tire. And such surface will be maintained through a wearing depth of the tire tread approximately equal to the diameter of the helical coils,—one-eighth of an inch for example. Further antiskid wearing depth is preferably obtained by building in additional laminations in the tire tread of the composite material of Fig. 2.

To make an antiskid tire of my invention, one can build new tires as I have disclosed. But in addition, my invention is particularly suitable for use in retreading used tires to give antiskid surfaces. In this connection I contemplate making up sheets of the composite material of Fig. 2 for retreading purposes, with just enough rubber to bond the tinsel wound cords into sheet form and for giving a good bond of such a sheet to a tire in a retreading operation. In my contemplated retreading operation, the purpose is preferably to put on the thinnest sheet practical for my purpose. It is not so much to put an entirely new tread on a tire as to merely add to a tread already on the tire a thin layer of material when the improved antiskid surface is desired. That is to say, the thin layer is to convert a tire tread already built into one with an improved or different kind of antiskid surface on the tread wearing portion. This conversion step may in some instances be carried out by winding the material of Fig. 1 on a used tire as on a drum surface, and building up the sheet material of Fig. 2 directly on the tire. There are air vulcanizing mixtures of and pre-vulcanized latex solutions on the market for building up rubber sheets away from the rubber factories. One such solution is known under the name of Vultex. In the way I have indicated, a thin tread covering of my antiskid material may be put on a used tire, bonded to the tire and in such a way that the tire construction is not disturbed but the thin "sandal" of antiskid material is merely added to function for a very substantial number of miles.

I am aware that metal components have been proposed for incorporation into rubber tire treads, including spring coils. My invention is directed to the particular methods and arrangements pointed out in the annexed claims.

Figure 1A:
Fig. 1A is a greatly enlarged view of Fig. 1.

As to some modifications: Instead of winding the tinsel wire in flattened form on the cord as in Fig. 1A, such wire may be wound on without flattening it. In that case it will have a better wearing diameter of the same weight. The extremely low weight of each coil is important to avoid throwing out the metal in the use of the tire. The use of a core of cotton for the coils adds to the antiskid function for the reason that as the antiskid tread layer wears away the cotton is exposed on the surface and in itself is an antiskid component at the surface. But the cotton core tends to wear away quite rapidly and in some instances it may be desirable to use a metal thread instead of the cotton core inside the coils. When a metal thread is used it is preferably made of brass alloy or brass plated so as to bond well with the rubber in vulcanization. This holding of the coils in place as securely as possible until worn out is an important consideration in building an antiskid tire tread. In some instances it is desirable to rubber coat the tinsel wire of the coils as by the electrolysis method before building them into the tread wearing layer so as to increase the bonding action.

Having disclosed my invention, I claim:

1. In an antiskid tread wearing layer of material for tires, the combination of a layer of metal wound thread with the metal coils on the thread slightly spaced apart and of a small diameter on the order of a fraction of an inch, there being many coils per inch of length, said metal wound thread being closely enough spaced in its layer to provide a great many spaced coils per square inch of area in such layer, said thread layer being unwoven and embedded in and bonded together by an integral sheet of vulcanized rubber, the wearing side of which rubber sheet is located to wear away with the layer of bonded metal coils placed to give such surface antiskid properties.

2. In an antiskid tread wearing layer of material for tires, the combination of a layer of closely spaced coils of flattened narrow tinsel wire wound on a thread core and having a small coil diameter on the order of an eighth of an inch and many coils to the inch of length, on the order of more than ten, said tinsel wound core threads being unwoven and closely spaced in said layer so as to present a great many coils per square inch of area, said layer being bonded in an integral sheet of rubber, the wearing side of which is placed to wear away coincidently with said first mentioned layer of metal wound thread.

3. An anti-slip material for tread wear which consists of strands of coiled tinsel wire, there being many spaced coils to the inch and of a small diameter wound about a core to make up a composite strand, such strands being arranged in close unwoven formation, and a sheet of tread wearing rubber bonding the strands together, the diameter of the strands being approximately equal to the normal wearing depth of the antislip material made of the composite materials.

4. An antiskid tire construction including a rubber tread having embedded therein a series of tinsel wound unwoven cords wrapped circumferentially of the tread and cut transversely to avoid circumferential strain in the cords, the vulcanized rubber of the tread bonding the cords therein, the tinsel of the cords having a copper component in the metal bonded to the rubber.

5. An antiskid tread for tires which consists in threads or cords covered by a winding of tinsel wire thereon in closely spaced helically arranged coils of a surface material of a character that bonds tightly when vulcanized in contact with rubber, such composite cord material being arranged in closely spaced cord arrangement, a layer of rubber in which said cord material so arranged is embedded, said layer of rubber with the cords so embedded being vulcanized and a tire carrying such layer on its tread surface for antiskid purposes.

FRANKLIN G. NEAL.